United States Patent [19]
Greatbach

[11] 3,951,435
[45] Apr. 20, 1976

[54] VEHICLE COUPLINGS
[76] Inventor: Robert Johnson Greatbach, P.O. Box 24636, Nairobi, Kenya
[22] Filed: Aug. 23, 1974
[21] Appl. No.: 500,049

Related U.S. Application Data
[63] Continuation-in-part of Ser. No. 395,710, Sept. 10, 1973, abandoned.

[30] Foreign Application Priority Data
Mar. 6, 1974 United Kingdom............... 10114/74

[52] U.S. Cl................................. 280/477; 280/492
[51] Int. Cl.² .......................................... B60D 1/00
[58] Field of Search............ 280/477, 478 R, 479 A, 280/492, 432

[56] References Cited
UNITED STATES PATENTS
3,360,281   12/1967   Allen............................ 280/432 UX
3,620,551   11/1971   Brown........................... 280/479 A
FOREIGN PATENTS OR APPLICATIONS
68,313   4/1958   France................................ 280/492

Primary Examiner—Robert R. Song
Assistant Examiner—R. Schrecengost
Attorney, Agent, or Firm—Woodhams, Blanchard and Flynn

[57] ABSTRACT

Two members of a vehicle coupling are respectively connected to a tractor and a trailer. The member connected to the tractor comprises an "A"-frame which is pivotable about a horizontal transverse axis disposed between the front and rear axles of the tractor below the plane defined by the axes of these axles. A first bearing journalled on a first spindle projecting from the upper end of the A-frame carries, on its opposite sides, two diametrically aligned bearings which receive second spindles secured to connecting means for connecting the two members of the coupling. When the members are connected, the axes of the first and second spindles extend horizontally and vertically and define a plane which is perpendicular to the horizontal transverse axis of the connection between the A-frame and the tractor and the bearings mounted on the first and second spindles accommodate rolling and yawing movement between the members.

11 Claims, 8 Drawing Figures

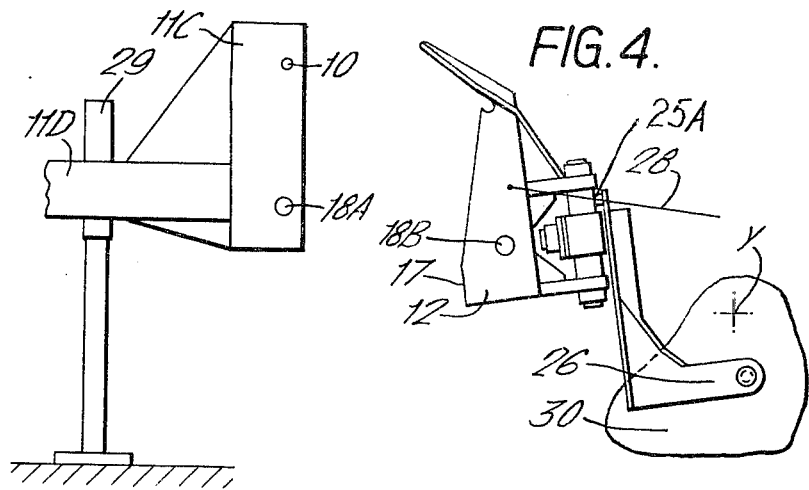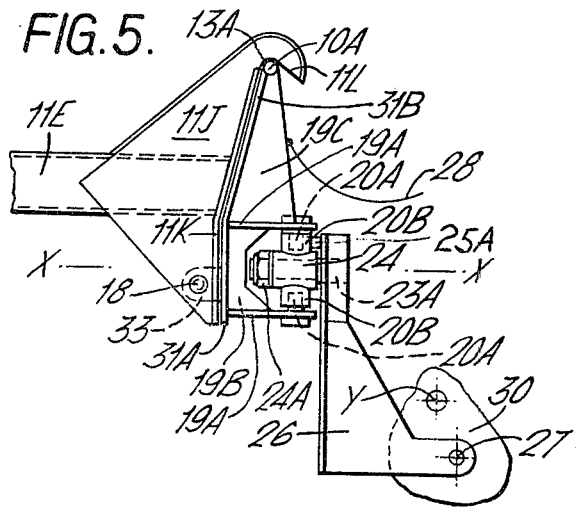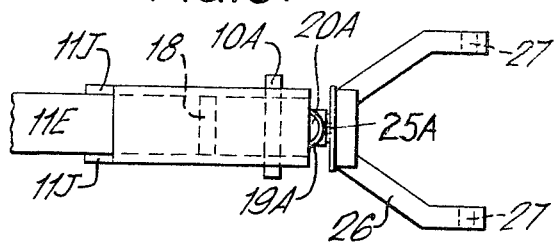

VEHICLE COUPLINGS

BACKGROUND OF THE INVENTION

This application is a continuation-in-part of application Ser. No. 395,710, filed Sept. 10, 1973, now abandoned, and relates to a vehicle coupling for releasably or permanently connecting two vehicles such as a tractor and its trailer.

As a result of the relative pitching, rolling and yawing movement between a tractor and its trailer, it is difficult to couple these vehicles so as to avoid instability.

SUMMARY OF THE INVENTION

It is an object of the present invention to provide a vehicle coupling which will enable the leading vehicle to carry part of the weight of the trailing vehicle in such a way as to improve the stability of the two vehicles.

According to the invention there is provided a vehicle coupling in which a first member is pivotally connectable to a first vehicle so as to be pivotable about a horizontal transverse axis, a second member is rigidly connectable to a second, trailer vehicle, and first and second pivot means which, in use have perpendicularly intersecting pivotal axes lying in a plane extending perpendicular to the horizontal transverse axis to accommodate relative rolling and yawing movement between the first and second vehicles are mounted on the first member so as to be disposed above the horizontal transverse axis and support connecting means for connection to the second member, one of the pivot means comprising a first bearing journalled on a central spindle and the other pivot means comprising two second bearings respectively mounted on outer spindles disposed on opposite sides of the first bearing along a common axis which is substantially vertical when the first and second vehicles are coupled together.

By this means, it is possible to suspend the transferred weight of the second, trailer vehicle, from the pivot means provided for accommodating rolling and yawing movement. Moreover, by positioning these pivot means above the horizontal transverse pivotal axis of the first member, it is possible to connect a conventional tractor power take-off to a driven machine without removing any part of the coupling.

The connecting means, which prevent horizontal separation of the first and second members of the coupling may comprise a shear pin which is insertable in aligned apertures formed in the first and second members or, alternatively, may comprise one or more latching devices.

Preferably, in order to ensure that the connecting means serve to lift the second, trailer vehicle, the connecting means may include first abutment means which are engageable with second abutment means on the second member on relative movement of the first member towards the second member so as to cause pivotal movement of the first member, from a position of maximum pivotal displacement of the first member on disengagement from the second member, and upward sliding movement of the first abutment means over the second abutment means. In this case, further abutment means are provided for limiting the upward movement of the first abutment means relative to the second abutment means prior to completion of relative movement of the first member towards the second member and the connecting means are capable of locking the first and second members against horizontal separation on completion of the relative movement of the first member towards the second member.

In one coupling embodying the invention, the first abutment means comprises the upper edge of a blind slot formed in the first member so as to extend upwardly and rearwardly to its open end for receiving a horizontal member extending transversely of the second member and forming the second abutment means. The connecting means in this form of construction may include apertured parts of the first and second members and a shear pin which is insertable in the aligned apertures formed in these apertured parts.

Thus, on movement of the vehicles towards each other, the horizontal means extending transversely of the second member of the coupling enters the open end of the blind slot formed in the first member of the coupling. As the vehicles move closer together, the upper surface of the slot rides over the horizontal member so as to cause the first member to pivot upwardly about the horizontal transverse axis of the connection between the first member and the first vehicle. At this pivotal movement of the first member continues, the closed end of the blind slot (which constitutes the further abutment means) bears against the horizontal member and thereafter lifts the horizontal member until the apertures formed in the apertured parts of the first and second members move into alignment. The shear pin is then inserted and the first and second members are coupled for load transmission.

In a preferred embodiment of the coupling, having an alternative form of construction, the first abutment means comprise a transversely extending horizontal member having a cylindrical or part-cylindrical surface, the second abutment means comprise a first surface which is engageable by the cylindrical or part-cylindrical surface of the first abutment means of the first member and the further abutment means comprise a second surface formed on the second member and connected to the first surface by a radiused connection which seats the cylindrical or part-cylindrical surface of the first abutment means.

To assist in guiding the horizontal member of the first abutment means along the first surface of the second abutment means, the first surface may be provided with side walls which are engageable with opposite ends of the horizontal member.

The connecting means may include an apertured tongue which is positionable between two apertured parts of the second member and a shear pin which is insertable within the aligned apertures. By inclining the second surface to the loading on the shear pin, so that the horizontal member bears against the second surface, it is possible to transfer part of the loading on the shear pin to the horizontal member.

To further assist in correctly locating the first and second members relative to each other, the apertured tongue forming part of the connecting means may be disposed so as to engage in a vertically extending slot formed in the lower part of the second member and the lower end of this slot may be formed with an upwardly converging mouth.

DESCRIPTION OF THE DRAWINGS

Vehicle couplings according to the present invention are hereinafter described, by way of example, with reference to the accompanying drawing in which:

FIG. 4 is a side elevation of the invention, showing first and second members disengaged from each other.

FIG. 5 is a side elevation of a further coupling embodying the invention, showing first and second members coupled together;

FIG. 6 is a plan view of the coupling shown in FIG. 5;

DESCRIPTION OF PREFERRED EMBODIMENTS

Figure 1:
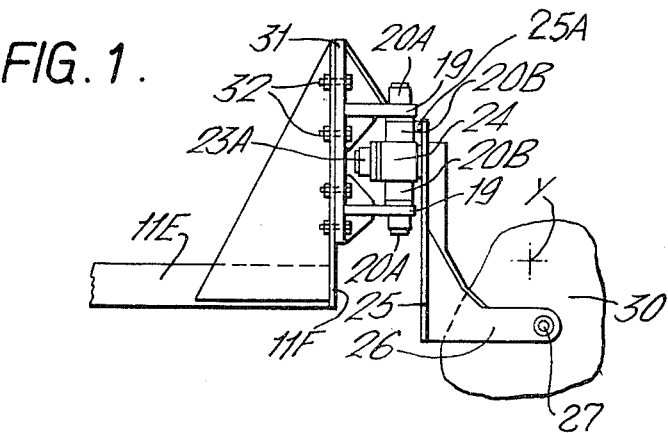
FIG. 1 is a side elevation of a first coupling embodying the invention.

As shown in FIG. 1, a first member of the coupling, in the form of an A-frame 26, is pivotally connectable to a tractor 30, only partly shown, by means of a bearing 27 in each of its legs. The A-frame 26 is provided with a cross-member 25 and a stud axle 23A projects rearwardly (leftwardly in FIG. 1) from the cross-member 25 to which it is attached. A first bearing 24 is journalled on the stub axle 23A to accommodate rolling movement between the tractor and its trailer and two second bearings 20B project from diametrically opposite sides of the bearing 24 to receive axially aligned yawing spindles 20A carried by two brackets 19 which are attached to an apertured plate 31.

The second member of the coupling comprises a conventional draw bar 11E carrying a further apertured plate 11F which is secured to the apertured plate 31 by means of nuts and bolts 32 or other detachable fastening means.

Figure 2:
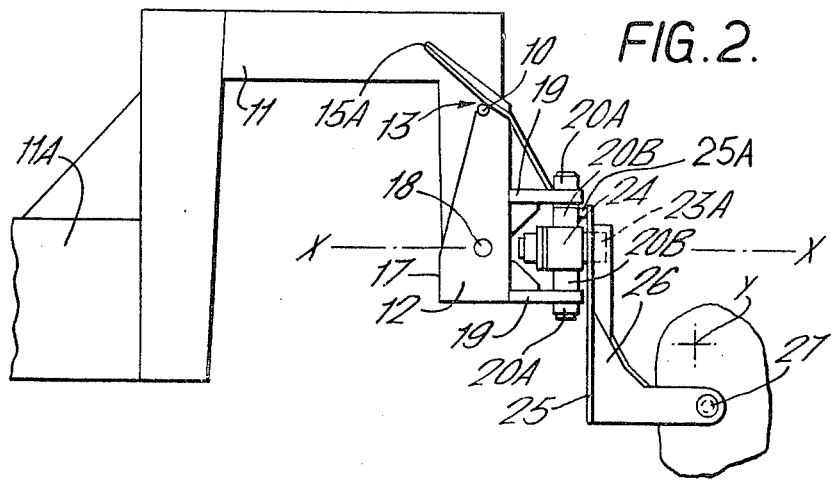
FIGS. 2 and 3 are a side elevation and plan view of a second coupling embodying the invention.
Figure 3:
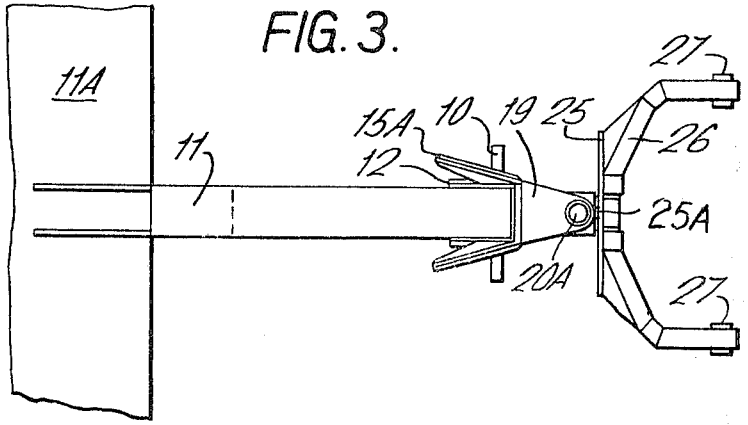

Referring to the arrangement shown in FIGS. 2 and 3, a horizontal peg 10 projects from both sides of a goose-neck draw-bar 11 connected to a trailer 11A. The two flanges 12 of a channel-section member 17 are each formed with inclined blind slots 13 so as to constitute recessed members for the reception of the ends of the peg 10. The upper edge of each slot 13 is provided with a guide plate 15A to facilitate entry of the peg 10 into the slots 13. A removable shear pin 18 is inserted in aligned apertures formed in the flanges 12 of the channel-section member 17 and in the goose-neck draw-bar 11.

Brackets 19 attached to the web of the channel-section member 17 support vertical yawing spindles 20A. A bearing 24 is mounted on a stub axle 23A projecting horizontally from the cross-member 25 of A-frame 26, to accommodate rolling, and carries bearings 20B for the yawing spindles 20A. The A-frame 26 is provided with bearings 27 for pivotal connection to a tractor about an axis which stands parallel to the axis of the peg 10.

In the arrangement shown, the shear pin 18 is disposed vertically below the peg 10 on the horizontal roll axis XX of the bearing 24, and the pivot axis of the bearing 27 is disposed below the axis of the peg 10 for connection to the tractor at a point within the wheel base of the tractor and below the axis Y of the rear axle of the tractor. A check cable (not shown) is attached to the A-frame 26 for supporting the A-frame when the members of the coupling are disengaged.

To engage the members of the coupling, the check cable is adjusted until the upper end of the slot 13 is aligned with the peg 10. The two vehicles are then moved together until the draw-bar is disposed between the divergent edges of the guide plates 15A. On further movement of the vehicles towards each other, the guide plates 15A ride over the projecting ends of the peg 10 causing the A-frame 26 to rotate upwardly in a clockwise direction until the peg 10 seats in the bottom of the slots 13. At this stage the shear pin apertures formed in the draw-bar 11 and the flanges 12 of the channel-section member 17 are not yet in alignment. To bring these apertures into alignment, it is necessary to move the vehicles still further together. This final movement of the tractor towards the trailer causes the channel-section member 17 to lift the peg 10, and therefore the draw-bar 11, to transfer part of the weight of the trailer 11A to the tractor. The shear pin is then inserted through the aligned apertures to lock the coupling ready for loading.

In the arrangement shown in FIG. 4, a box section member 11C is secured to the rear end of a straight draw-bar 11D. As in the embodiment described with reference to FIGS. 2 and 3 the box-section member 11C is provided with a horizontal peg 10 which projects from both sides and is formed with an aperture 18A for the reception of a shear pin (not shown). In the arrangement shown, the members of the couplings are disengaged from each other, the A-frame 26 being supported by check cable 28. The draw-bar 11D is mounted on a retractable landing leg 29, and the first coupling member, of which the A-frame 26 forms a part, is constructed in exactly the same manner as the corresponding components of the coupling shown in FIGS. 2 and 3, the flanges 12 of the channel-section member 17 being formed with apertures 18B for the reception of the shear pin.

In the arrangement of FIGS. 5 and 6, the first member of the coupling in the form of an A-frame 26, has legs provided with bearings 27 for connecting the first member to a tractor 30 (only partly shown) for pivotal movement about a horizontally extending transverse axis disposed within the wheel base of the tractor 30, between the front and rear axles below the plane defined by the axes of the front and rear axles of the tractor (such axis Y of the rear axle). A central spindle in the form of a stub axle 23A projects rigidly from the upper end of the first member and supports a first bearing 24 which is held in place by a nut 24A engaging a screw thread formed on the outer end of the stub axle 23A. Two co-axially aligned second bearings 20B project from opposite sides of the first bearing 24 and receive yawing spindles 20A mounted in bracket plates 19A.

The bracket plates 19A are held together by two gusset plates 19B (only one of which is shown) and support an abutment plate having a lower portion 31A extending perpendicular to the axis of the stub axle 23A and an upper portion 31B which is inclined so as to lie parallel to a first surface 11G (FIG. 8) provided by the upper portion 11H of a plate which is supported by two vertical bracket plates 11J. These plates 11J are welded to a horizontally extending box-sectioned member 11E to form the second member of the coupling.

Figure 8:
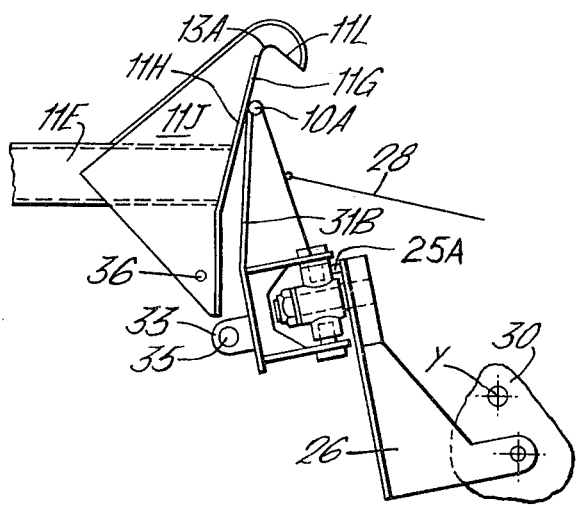
FIG. 8 is a side elevation of the coupling shown in FIG. 5, but showing the first and second members uncoupled from each other.

The upper portion 31B of the plate supported by the bracket plates 19A and two further bracket plates 19C (only one of which is shown) support a cylindrical abutment pin 10A. As shown in FIG. 8, the upper ends of the bracket plates 11J of the second member of the coupling each overlie the abutment pin 10A so as to provide part of a second surface 11L which is connected to the first surface 11G by means of an arcuate surface 13A which is complementary to the surface of the abutment pin 10A.

To connect the first and second members of the coupling, the towing vehicle is backed towards the trailing vehicle (not shown). The first member is supported by the check chain 28 in a position of maximum pivotal movement, in an anticlockwise sense, as shown in FIG. 8. The abutment pin 10A therefore comes into engagement with the first surface 11G and slides upwardly along this surface 11G until the abutment pin 10A seats in the arcuate surfaces 13A connecting the first and second surfaces 11G and 11L. At this stage, the clockwise rotation of the A-frame 26 has not proceeded until the upper portions 31B and 11H of the abutment plates carried by the first and second members lie in parallel abutment. This only occurs after further movement of the towing vehicle towards the trailing vehicle when the continued clockwise rotation of the A-frame 26 about bearings 27 causes the second member to be lifted so as to transfer part of the weight of the trailing vehicle on to the towing vehicle.

Figure 7:
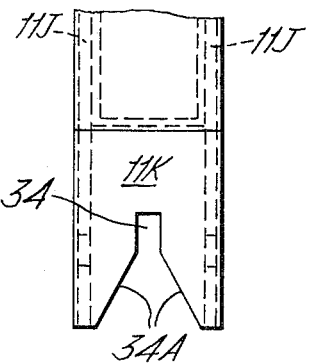
FIG. 7 is an end elevation of part of the second member of the coupling shown in FIG. 5 and 6.

As the A-frame 26 is rotated clockwise into its final position, a tongue 33 projecting from the lower portion 31A of the plate carried by the bracket plates enters a slot 34 (FIG. 7) formed in the lower portion 11K of the plate carried by the vertical bracket plates 11J. As shown in FIG. 7, the lower end of this slot 34 has inclined edges 34A which define an upwardly convergent mouth which serves to guide the tongue 33 into the central upper portion of the slot 34. When the A-frame 26 of the first member has been rotated into its final position, apertures 35 and 36 formed respectively, in the tongue and the vertical bracket plates 11J are horizontally aligned for reception of a shear pin 18, as shown in FIGS. 5 and 6.

When the first and second members of the coupling are locked together by means of the shear pin 18, pitching, rolling and yawing movement of the trailing vehicle relative to the towing vehicle are accommodated by pivotal motion about the axes of the bearings 27, the stub axle 23A and the two yawing spindles 20A. The shear loading on the pin 18 acts along a line passing through the centre of the pin 18 and the horizontal axis through the bearings 27 in the legs of the A-frame 26. However, the shear pin 18 is relieved of part of this loading by inclining the edges of the plates 11J defining the second surface 11L so that they intersect with the line of action of this shear loading to provide bearing abutment with the abutment pin 10A.

One very important feature of the arrangement of pivot means having perpendicularly intersecting axes, provided in each of the embodiments described hereinbefore, is that no torsional loading can be transmitted through the coupling between the trailer and the tractor and this improves stability of these vehicles.

Another important practical feature of the three illustrated embodiments of the invention is the provision of chock 25A between the upper second bearing 20B and an adjacent portion of the cross-member 25 of the A-frame 26 to resist bending of the central spindle 23A under load. Conveniently, the chock 25A may be attached to the upper second bearing 20B by means of a screw (not shown). To prevent frictional binding between the chock 25A and the cross-member 25, a clearance, for example: 0.030 inch, is provided between these components when the coupling is unstressed.

Having defined my invention, I claim:

1. A vehicle coupling in which a first member is pivotally connectable to a first vehicle so as to be pivotable about a horizontal transverse axis, a second member is rigidly connectable to a second vehicle, first and second pivot means having perpendicularly intersecting pivotal axes lying in a plane extending perpendicular to the horizontal transverse axis to accommodate relative rolling and yawing movement between the first and second vehicles are mounted on the first member so as to be disposed above the horizontal transverse axis and support connecting means for connection to the second member, one of the pivot means comprising a first bearing journalled on a central spindle and the other pivot means comprising two second bearings respectively mounted on outer spindles disposed on opposite sides of the first bearing along a common axis which is substantially vertical when the first and second vehicles are coupled together, and a chock is disposed between the upper second bearing and an adjacent portion of the first member to resist bending of the central spindle carrying the first bearing under load.

2. A tractor-trailer combination in which a trailer is connected to a tractor for articulation about mutually perpendicular pitching, rolling and yawing axes by means of a vehicle coupling, the vehicle coupling comprising:
   a first member which is pivotally connected to the tractor so as to be pivotable about a horizontal transverse pitching axis which is positioned ahead of and below the axis of the rear axis of the tractor;
   a second member which is rigidly connected to the trailer;
   a central spindle projecting rearwardly from a rigid connection with the first member so as to define a horizontal, longitudinally extending rolling axis which is disposed above the pitching axis;
   a first bearing journalled on the central spindle for rotation about the rolling axis;
   two second bearings respectively journalled on two outer spindles to form two pivot assemblies which project perpendicularly from diametrically opposite sides of the first bearing along a common vertical yawing axis which intersects the first bearing at least closely adjacent the midpoint thereof; and
   connecting means respectively supported by the two pivot assemblies for connection to the second member.

3. A coupling according to claim 2, in which the outer spindles are carried by brackets which are attached to a flat plate for abutting connection to a flat plate on the second member by detachable fastening means.

4. A coupling according to claim 3, in which the flat plates of the first and second members are apertured and connected by nuts and bolts.

5. A coupling according to claim 2, in which the connecting means comprises first abutment means, second abutment means provided on the second member are engageable by the first abutment means on relative movement of the first member towards the second member so as to cause pivotal movement of the first member, from a position of maximum pivotal displacement of the first member on disengagement from the second member, and upward sliding movement of the first abutment means over the second abutment means, further abutment means are provided for limiting the upward movement of the first abutment member towards the second abutment means prior to completion of relative movement of the first means relative to the second member and the connecting means are operable to lock the first and second members against horizontal separation on completion of the relative movement of the first member towards the second member.

6. A coupling according to claim 5, in which the first abutment means comprise the upper edge of at least one blind slot formed in the first member so as to extend upwardly and rearwardly to the open end of each said slot, the second abutment means comprise a horizontal member extending transversely of the second member for reception in each said blind slot formed in the first member and the further abutment means are constituted by the closed end of each said blind slot.

7. A coupling according to claim 5, in which the first abutment means comprise a horizontal member extending transversely of the first member, the second abutment means comprise a first surface which is engageable by the horizontal member and the further abutment means comprise a second surface of the second member.

8. A coupling according to claim 7, in which the connecting means comprise a shear pin which is insertable in aligned apertures formed in the first and second members and the projection of the second surface away from the first surface of the second member intersects the plane defined by the axis of the shear pin and the horizontal transverse axis of the pivotal connection between the first member and the tractor.

9. A coupling according to claim 2, in which the connecting means include an apertured tongue which is positionable between two apertured parts of the second member and a shear pin is insertable in the aligned apertures.

10. A leading vehicle-trailing vehicle combination in which one vehicle is connected to the other vehicle for articulation about mutually perpendicular pitching, rolling and yawing axes by means of a vehicle coupling, the vehicle coupling comprising:
- a first member which is pivotally connected to said one vehicle so as to be pivotable about a horizontal transverse pitching axis;
- a second member which is rigidly connected to said other vehicle;
- a central spindle projection rearwardly from a rigid connection with the first member so as to define a horizontal, longitudinally extending rolling axis which is disposed above the pitching axis;
- a first bearing journalled on the central spindle;
- two second bearings respectively journalled on two outer spindles to form two pivot assemblies which project perpendicularly from diametrically opposite sides of the first bearing along a common vertical yawing axis which intersects the first bearing at least closely adjacent the midpoint thereof;
- connecting means supported by the two pivot assemblies; and
- locking means for fixedly but releasably connecting said connecting means to said second member, said locking means being disposed in its entirety on one side of a vertical plane which contains said yawing axis and is parallel to said pitching axis, said pitching axis being disposed on the other side of said vertical plane.

11. A coupling according to claim 10, in which said leading vehicle has a rear axle which is positioned so that the rotational axis thereof is located horizontally between said pitching axis and said yawing axis, said pitching axis being substantially parallel to but spaced downwardly from said rotational axis; and
in which said first bearing and said two said second bearings define a substantially cruciformed-shaped member so that said yawing axis is substantially perpendicular to and intersects said rolling axis substantially at the midpoint of said first bearing.

* * * * *

UNITED STATES PATENT OFFICE
CERTIFICATE OF CORRECTION

Patent No. 3,951,435          Dated April 20, 1976

Inventor(s) Robert Johnson Greatbatch

It is certified that error appears in the above-identified patent and that said Letters Patent are hereby corrected as shown below:

Please correct the spelling of Applicant's last name so as to read "Greatbatch".

Signed and Sealed this

Twenty-eighth Day of September 1976

[SEAL]

Attest:

RUTH C. MASON
*Attesting Officer*

C. MARSHALL DANN
*Commissioner of Patents and Trademarks*